(12) United States Patent
Torres et al.

(10) Patent No.: US 11,637,765 B2
(45) Date of Patent: *Apr. 25, 2023

(54) HIERARCHICAL MULTI-TIER THROUGHPUT ASSIGNMENT FOR A SHARED THROUGHPUT SATELLITE NETWORK

(71) Applicant: Hughes Network Systems, LLC, Germantown, MD (US)

(72) Inventors: Robert J. Torres, New Market, MD (US); Hanny Kadrichu, North Potomac, MD (US); John L. Border, Middletown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/444,252

(22) Filed: Aug. 2, 2021

(65) Prior Publication Data

US 2022/0045926 A1 Feb. 10, 2022

Related U.S. Application Data

(63) Continuation of application No. 16/731,473, filed on Dec. 31, 2019, now Pat. No. 11,108,669.

(51) Int. Cl.
*H04B 7/185* (2006.01)
*H04L 12/24* (2006.01)
*H04L 12/26* (2006.01)
*H04L 12/66* (2006.01)
*H04L 43/0888* (2022.01)
*H04L 41/5003* (2022.01)

(52) U.S. Cl.
CPC ......... *H04L 43/0888* (2013.01); *H04B 7/185* (2013.01); *H04L 12/66* (2013.01); *H04L 41/5003* (2013.01)

(58) Field of Classification Search
CPC ..... H04B 7/185; H04L 12/66; H04L 41/5003; H04L 43/0888
See application file for complete search history.

(56) References Cited

U.S. PATENT DOCUMENTS

| 8,660,006 B2 | 2/2014 | Torres et al. |
| 8,929,217 B2 | 1/2015 | Torres et al. |
| 10,104,177 B2 | 10/2018 | Roy et al. |

(Continued)

OTHER PUBLICATIONS

International Search Report and Written Opinion for PCT/US2020/067358 dated May 6, 2021, all pages.

*Primary Examiner* — Alpus Hsu
(74) *Attorney, Agent, or Firm* — Kilpatrick Townsend & Stockton, LLP

(57) ABSTRACT

Various arrangements for monitoring and enforcing multi-tier throughput assignments in a network, such as satellite-based communication network, are presented. Throughput usage may be monitored on a beam-level, satellite-level, gateway-level, and system level. Throughput usage for individual satellite terminals may be aggregated and used to determine the throughput usage on an entity-by-entity basis. An entity can have one or more sub-entities to which throughput is allocated. Excessive throughput usage for higher-tier entities can result in throughput being restricted for satellite terminals associated with lower-tier entities.

20 Claims, 5 Drawing Sheets

(56) References Cited

U.S. PATENT DOCUMENTS

| | | | |
|---|---|---|---|
| 10,135,154 B2* | 11/2018 | Hreha | H04W 72/0446 |
| 10,347,987 B2* | 7/2019 | Hreha | H04B 7/1851 |
| 10,362,120 B2 | 7/2019 | Roy et al. | |
| 10,397,926 B2* | 8/2019 | Ravishankar | H04B 7/18532 |
| 10,601,502 B2 | 3/2020 | Roy et al. | |
| 10,667,264 B2 | 5/2020 | Torres et al. | |
| 10,932,268 B2* | 2/2021 | Ravishankar | H04B 7/18563 |
| 11,108,669 B2 | 8/2021 | Torres et al. | |
| 2015/0296409 A1 | 10/2015 | Xu et al. | |
| 2016/0072574 A1 | 3/2016 | Xu et al. | |
| 2016/0072691 A1 | 3/2016 | Xu et al. | |
| 2017/0289822 A1 | 10/2017 | Hreha et al. | |
| 2018/0006713 A1 | 1/2018 | Hreha et al. | |
| 2018/0152351 A1 | 5/2018 | Satyajit et al. | |

\* cited by examiner

HIERARCHICAL MULTI-TIER THROUGHPUT ASSIGNMENT FOR A SHARED THROUGHPUT SATELLITE NETWORK

CROSS-REFERENCES TO RELATED APPLICATIONS

This application is a continuation of U.S. patent application Ser. No. 16/731,473, filed on Dec. 31, 2019, entitled "Hierarchical Multi-Tier Throughput Assignment For A Shared Throughput Satellite Network," the disclosure of which is hereby incorporated by reference in its entirety for all purposes.

BACKGROUND

In a multi-tiered service level arrangement, a network operator may enter into a service level agreement with a service provider that purchases bulk access to the operator's network. In turn, the service provider may enter into agreements with various entities that desire to obtain access to the network via the service provider. Such a hierarchical arrangement can be complicated to manage, especially since each of the various service providers and entities may desire different levels of service.

SUMMARY

Various systems and methods are presented here. In some embodiments, a satellite network throughput management system is presented. A plurality of satellite gateways may be presented. Each satellite gateway of the plurality of satellite gateways can serve to connect a plurality of satellite terminals with one or more networks. A plurality of gateway-level throughput monitoring systems may be present. Each gateway-level throughput monitoring system of the plurality of gateway-level throughput monitoring systems can be part of a different satellite gateway of the plurality of satellite gateways. Each gateway-level throughput monitoring system of the plurality of gateway-level throughput monitoring systems can determine a throughput amount used by each entity of a plurality of entities. Each entity of the plurality of entities can be mapped to a plurality of satellite terminals. A subset of the entities of the plurality of entities can obtain network access through a service provider entity of the plurality of entities. Each entity of the subset of entities can be restricted by an individual amount of throughput allocated to the entity and a total throughput allocated to the service provider entity. A system-level throughput monitoring system may be present that is in communication with each of the plurality of gateway-level throughput monitoring systems and can aggregate the throughput amount used by each of the plurality of entities.

Embodiments of such a system can include one or more of the following features: A throughput allocation database may be present that defines an allocated throughput amount for each entity of the plurality of entities. Each gateway-level throughput monitoring system can be configured to restrict an amount of throughput allocated to an entity of the plurality of entities in response to satellite terminals mapped to the entity collectively requesting more throughput from the satellite gateway associated with the gateway-level throughput monitoring system than allocated to the entity in the throughput allocation database. The entity can be the service provider entity. The gateway-level throughput monitoring system can be configured to restrict the amount of throughput allocated to each satellite terminal of the subset of the entities mapped to the service provider entity. The system-level throughput monitoring system can be configured to determine that an entity of the plurality of entities is to have an amount of throughput allocated to the entity restricted in response to the entity collectively requesting more throughput across multiple satellite gateways of the plurality of satellite gateways than allocated to the entity in the throughput allocation database. The system-level throughput monitoring system may be configured to transmit a request to a satellite gateway of the plurality of satellite gateways to restrict throughput for satellite terminals mapped to the entity. The system-level throughput monitoring system can be configured to transmit requests to multiple satellite gateways of the plurality of satellite gateways to restrict throughput for satellite terminals mapped to the entity. The system can include one or more satellites that relay data between the plurality of satellite terminals and the plurality of satellite gateways. Each satellite gateway of the plurality of satellite gateways can allocates excess available throughput, up to an amount demanded, to a particular entity of the plurality of entities.

In some embodiments, a method for monitoring and enforcing multi-tier throughput assignments can be presented. The method can include monitoring throughput usage on a satellite terminal by satellite terminal basis for each beam of a plurality of satellite communication beams. Each satellite terminal of a plurality of satellite terminals may be mapped to one or more entities of a plurality of entities. A subset of the entities of the plurality of entities can obtain network access through a service provider entity of the plurality of entities. Each entity of the subset of entities can be restricted by an individual amount of throughput allocated to the entity and a total throughput allocated to the service provider entity. The method can include aggregating throughput usage for each entity based on throughput usage of each satellite terminal of the plurality of satellite terminals mapped to the entity. The method can include providing beam-level aggregate throughput usage for each entity of the plurality of entities to a gateway-level throughput monitoring system. The method can include aggregating, by the gateway-level throughput monitoring system, throughput usage for each entity based on beam-level aggregate throughput usage on an entity-by-entity basis at the gateway-level. The method can include providing gateway-level aggregate throughput usage for each entity of the plurality of entities by the plurality of satellite gateways to a system-level throughput monitoring system. The method can include aggregating, by a system-level throughput monitoring system, throughput usage for each entity based on gateway-level aggregate throughput usage on the entity-by-entity basis at the system-level.

Embodiments of such a method can include one or more of the following features: The method can include determining that restricting throughput is to be performed for a beam of the plurality of satellite communication beams based on accessing a throughput allocation database that defines an allocated throughput amount for each entity of the plurality of entities. The method can include determining at the gateway-level that restricting throughput is to be performed for multiple beams of the plurality of satellite communication beams based on accessing a throughput allocation database that defines an allocated throughput amount for each entity of the plurality of entities. The method can include restricting an amount of throughput allocated to an entity of the plurality of entities in response to satellite terminals mapped to the entity collectively requesting more throughput from a satellite gateway than allocated to the entity in the throughput allocation database. The entity may be a service provider entity. The gateway-level throughput monitoring system may be configured to restrict the amount of throughput allocated to each satellite terminal of the subset of the entities. The method can include determining at the system-level that restricting throughput is to be performed at a gateway-level based on accessing a throughput allocation database that defines an allocated throughput amount for each entity of the plurality of entities. The method can include restricting an amount of throughput allocated to the service provider entity restricted in response to the entity collectively requesting more throughput across multiple satellite gateways of the plurality of satellite gateways than allocated to the service provider entity in the throughput allocation database. The method can include transmitting, by the system-level throughput monitoring system, a request to a satellite gateway of the plurality of satellite gateways to restrict throughput for satellite terminals mapped to the subset of entities that are mapped to the service provider entity. The method can include transmitting, by the system-level throughput monitoring system, requests to multiple satellite gateways of the plurality of satellite gateways to restrict throughput for satellite terminals mapped to the service provider entity. The plurality of satellite communication beams may be routed via one or more satellites that are geosynchronous, in a low-earth orbit, or mid-earth orbit. Each satellite gateway of the plurality of satellite gateways may allocate excess available throughput, up to an amount demanded, to a particular entity of the plurality of entities.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A satellite network provider may provide satellite-based communication services, such as Internet access or private network access, to a variety of entities. At least some of these entities may allocate their acquired throughput (i.e., the amount of data moved successfully from one place to another in a given time period), to multiple other entities. As an example of this, a satellite network provider may provide a defined amount of throughput to an entity that is functioning as a network service provider. The network service provider may then subdivide its throughput among another group of entities, such as individual customers.

The satellite network provider may use a system, as detailed herein, to monitor the amount of satellite communication resources (e.g., throughput, bandwidth) used on a terminal-by-terminal basis. At various points in a satellite system monitoring hierarchy, the terminal-by-terminal resource usage can be aggregated to determine if an entity has exceeded its assigned resources. Decisions to restrict resources to satellite terminals mapped to a particular entity may be made at the beam level, the satellite level, the gateway level, and/or the system level.

Restrictions to resources provided to satellite terminals can be performed in accordance with a pre-established arrangement between the entity and the satellite network provider (or between the entity and another entity, such as a network service provider, which is enforced by the satellite network provider). Data throughput may be decreased across all satellite terminals mapped to the entity or may be enforced according to some other scheme, such as only satellite terminals communicating with a particular satellite gateway have their throughput restricted in order to satisfy the entity's pre-established agreement. While the following description focuses on throughput, in other embodiments, additional or alternative metrics may be monitored and used to determine whether restriction should occur.

While the embodiments detailed herein are focused on satellite-based networks, the concepts can be applied to other forms of networks. For instance, a 4G or 5G cellular network may be monitored and have its uplink and downlink capacity controlled in accordance with the embodiments detailed herein.

Figure 1:
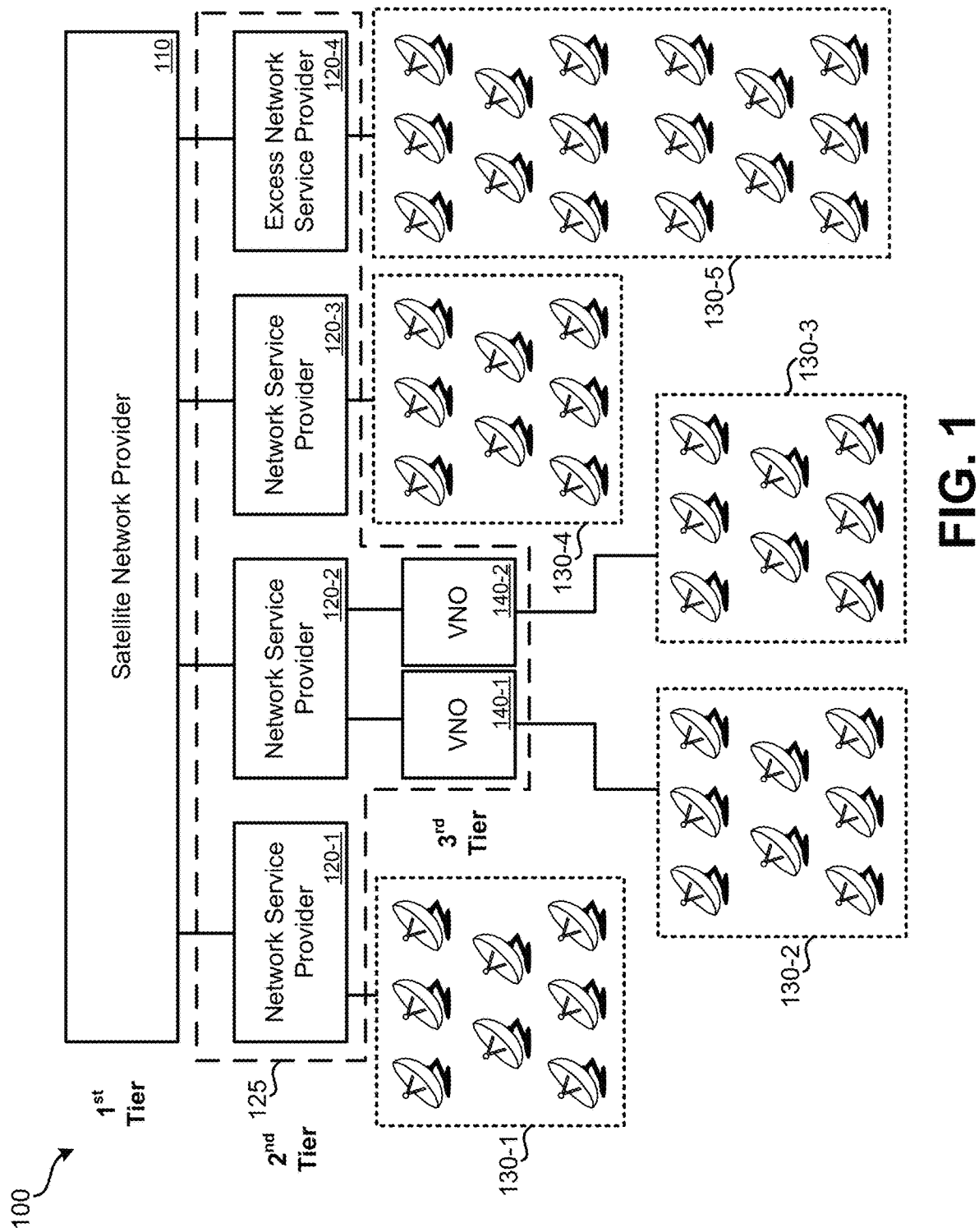
FIG. 1 illustrates a block diagram indicative of a hierarchical structure of satellite service providers.

Further detail is provided in relation to the figures. FIG. 1 illustrates a block diagram indicative of a hierarchical structure 100 ("structure 100") of satellite service providers. In hierarchical structure 100, satellite network provider 110 operates a satellite-based communication network that allows satellite terminals 130 to communicate with various gateways of the satellite network provider that allow for communication with public and/or private networks. Such communication can be used for voice, video, data, and possibly various other forms of communication. Further detail regarding how satellite network provider 110 communicates with satellite terminals 130 is provided in relation to FIG. 3.

As shown in FIG. 1, various entities 125 reside in hierarchical structure 100 between satellite network provider 110 and satellite terminals 130. When satellite-based communications are performed, satellite terminals 130 communicate directly with satellite network provider 110. For satellite terminals 130, a given satellite terminal may have multiple assigned throughput rates, such as minimum data rate, a committed information rate (CIR), and a peak information rate (PIR). A number of terminals sharing a common resource (e.g., a same beam), regardless of whether the satellite terminals are mapped to a same or different entity, can compete for the same resources. CIR can refer to the throughput that has been guaranteed to an entity in particular operating situations, minimum data rate can refer to the minimum data rate that will occur in particular situations. When excess bandwidth is not committed to other satellite terminals and a demand exists, a satellite terminal may experience up to the PIR. As an example, if a demand for throughput for an entity's satellite terminals is 250 Gbps, but the CIR is 100 Gbps, the system may assign, say somewhere between 100 Gbps (which is the CIR) and 200 Gbps (which is the PIR).

In some embodiments, additionally or alternatively, restrictions may also be enforced on an entity-by-entity basis separate from throughput. For instance, limitations can be placed on the number of symbols used to achieve the committed Mbps. To achieve a given throughput, the number of symbols that needs to be transmitted, which factors in error correction, increases as the signal strength decreased. Therefore, if a satellite antenna of a satellite terminal is pointed at a significant angle to the satellite, the number of symbols needed to be transmitted to achieve a given throughput may increase significantly. A limitation of symbols per second (e.g., Msps) may be set in order to prevent satellite terminals of a given entity from significantly decreasing the throughput of the system as a whole by having a significant number of poorly pointed satellite terminal antennas. Therefore, in addition to throughput as discussed below, an alternative or additional metric measured and aggregated on an entity-by-entity basis at the beam level, satellite level, gateway level, and/or system level may be a floor on bits per symbol.

Satellite network provider 110, through various gateway systems and satellites, provides uplink and downlink communication throughput to satellite terminals 130. Some or all of satellite terminals 130 may provide communication services to one or more user devices, such as smartphones, laptop computers, desktop computers, gaming devices, smart home devices, and various other forms of computerized devices.

Satellite network provider 110 has a finite amount of uplink throughput and downlink throughput to be allocated. Satellite network provider 110 can enter into various agreements various entities such as network service providers 120. In an agreement, such as a service level agreement, network service satellite network provider 110 may specify various quality of service levels that satellite network provider 110 agrees to provide. The agreement may specify a maximum amount of throughput that will be provided to the network service provider, such as network service provider 120-1, for uplink and downlink data transmissions for all satellite terminals of the network service provider. Other terms of service the service level agreement and the network service provider, such as network service provider 120-1, can include throughput, availability, latency, and packet loss. While this document is focused on throughput, multiple metrics may be aggregated and controlled using the arrangements detailed herein, including minimum data transmission rates, committed data transmission rates, and peak data transmission rates.

Satellite terminals 130-1 are each mapped to network service provider 120-1. For instance, network service provider 120-1 may have entered into an agreement with satellite network provider 110 for a defined amount of uplink data throughput and downlink data throughput. Collectively, regardless of geographic location and capacity of the network of satellite network provider 110, satellite terminals 130-1 are restricted by the defined amount of uplink data throughput and downlink data throughput. Further, network service provider 120-1 may set a geographic, such as per beam, or non-geographic limit for associated satellite terminals. Such an arrangement can prevent satellite terminals in one particular region from taking too large a portion of a particular entity's allocation of throughput.

Entities 125 refer to entities that either subdivide their allocated uplink and downlink throughput among additional entities or provide such uplink and downlink throughput to satellite terminals. Therefore, network service providers and virtual network operators (VNOs) 140 represent types of entities in FIG. 1. It should be understood that the terms "network service provider" and "virtual network operator" are arbitrary and are merely used herein to distinguish between entities that are part of a second and third tier below the first tier of satellite network provider 110.

Network service provider 120-2 represents a hierarchical arrangement with an additional level compared to network service provider 120-1. In the example of network service provider 120-2, network service provider 120-2 has reached an agreement to provide some amount of uplink data throughput and downlink data throughput to VNO 140-1 and VNO 140-2. Different amounts of uplink data throughput and downlink data throughput may be provided to each of VNOs 140. Therefore, regardless of the number of satellite terminals mapped to each of VNOs 140, each VNO may be restricted to the amount of uplink and downlink throughput agreed to with network service provider 120-2.

Network service provider 120-2, may "oversubscribe" its available uplink and/or downlink throughput. For example, network service provider 120-2 may have acquired the rights to 10 Gbps downlink throughput from satellite network provider 110. Network service provider 120-2 may also have entered into agreements with each of VNOs 140 to provide each with, for example, 6 Gbps downlink throughput. Since each VNO may rarely use its entire allocated throughput, network service provider 120-2 may almost always remain within its allocated 10 Gbps. However, it is also possible that while each VNO may be within its agreement of 6 Gbps, network service provider 120-2 may meet or exceed its agreement with satellite network provider 110 of 10 Gbps. Therefore, in addition to monitoring the total uplink throughput and downlink throughput of the satellite terminals mapped to each VNO, additional monitoring may be performed at each tier to ensure that entities higher and lower in the hierarchy, such as network service provider 120-2 above VNOs 140, also remains within the permitted bounds of its agreement with satellite network provider 110.

In the illustrated example of FIG. 1, the largest hierarchical example relates to network service provider 120-2, which has a third tier of VNOs 140-1, which in turn each serve some number of satellite terminals. It should be understood that in other embodiments, it may be possible for a greater number of tiers to be present. For example, VNO 140-1 may enter into agreements with multiple additional entities that further subdivides the uplink and downlink throughput acquired by VNO 140-1 from network service provider 120-2. Again here, it may be possible for an entity to "oversubscribe" its throughput to multiple lower-tier entities. That is, enter into agreements promising a greater amount of uplink and/or downlink throughput than to which the entity has the rights. The entity, in such cases, may be relying on the lower-tier entities only infrequently requesting their maximum agreed upon uplink and/or downlink throughput. When such an additional tier is present, additional monitoring may be performed to ensure that each lower tier entity, each VNO, and each network service provider do not exceed their permitted uplink and/or downlink throughput.

In the illustrated embodiment of hierarchical structure 100, satellite terminals 130-1 acquired access to the system of satellite network provider 110 through network service provider 120-1. Satellite terminals 130-2 acquired access to the system of satellite network provider 110 through VNO 140-1, which in turn acquired access to satellite networks provider 110 via network service provider 120-2. Satellite terminals 130-3 acquired access to the system of satellite network provider 110 through VNO 140-2, which in turn acquired access to satellite networks provider 110 via network service provider 120-2. Satellite terminals 130-4 acquired access to the system of satellite network provider 110 through network service provider 120-3.

Excess network service provider 120-4 can represent a special class of entity that functions as part of the second-tier of entities. Excess network service provider 120-4 may receive some or all of the excess bandwidth that is not being used by other second-tier entities, such as network service provider 120-1, 120-2, and 120-3. As an example of this, if satellite network provider 110 is capable of providing downlink throughput of 100 Gbps and network service providers 120-1, 120-2, and 120-3 are only collectively using 73 Gbps of downlink throughput, the remaining 27 Gbps of downlink throughput may be provided to excess network service provider 120-4, assuming the demand is present for that excess throughput. While excess network service provider 120-4 may have an agreement that indicates a particular minimum amount of uplink and/or downlink throughput that will be provided by satellite network provider 110, excess network service provider 120-4 may additionally benefit from whatever excess capacity is available on the network of satellite network provider 110. As an example, excess network service provider 120-4 may be a consumer Internet access service of which satellite terminals 130-5 are installed at the premises of individual customers. In some situations, excess network service provider 120-4 may be a business division of satellite network provider 110. If the demand is not present, the excess throughput may be allocated to other satellite terminals, thus causing them to experience throughput above a CIR up to a PIR.

When the illustrated embodiment of hierarchical structure 100, the numbers of entities present on the second and third tier are merely exemplary. Greater or fewer numbers of entities, such as network service providers 120 and VNOs 140 can be present in other embodiments. Further, the number of tiers of entities can vary. For instance, some embodiments may only include the first tier of satellite network provider 110 and a second-tier of entities. Other embodiments may include a third tier, fourth, or more. Further, the number of satellite terminals that are mapped to an entity can vary substantially, for instance the number of satellite terminals mapped to an entity may vary from one to tens of thousands. Further, these satellite terminals may be geographically concentrated and, thus, may only communicate with one particular satellite gateway via one satellite or may be geographically distributed and communicate with multiple satellite gateways using one or more satellites.

The example of FIG. 1 is relatively simplistic; however, from the example, it can be understood how many entities and multiple tiers of entities can be managed to provide satellite-based communication services to satellite terminals. The system detailed in relation to FIG. 2 can be highly scalable, allowing the system to be used for relatively small satellite networks and relatively large satellite networks.

Figure 2:
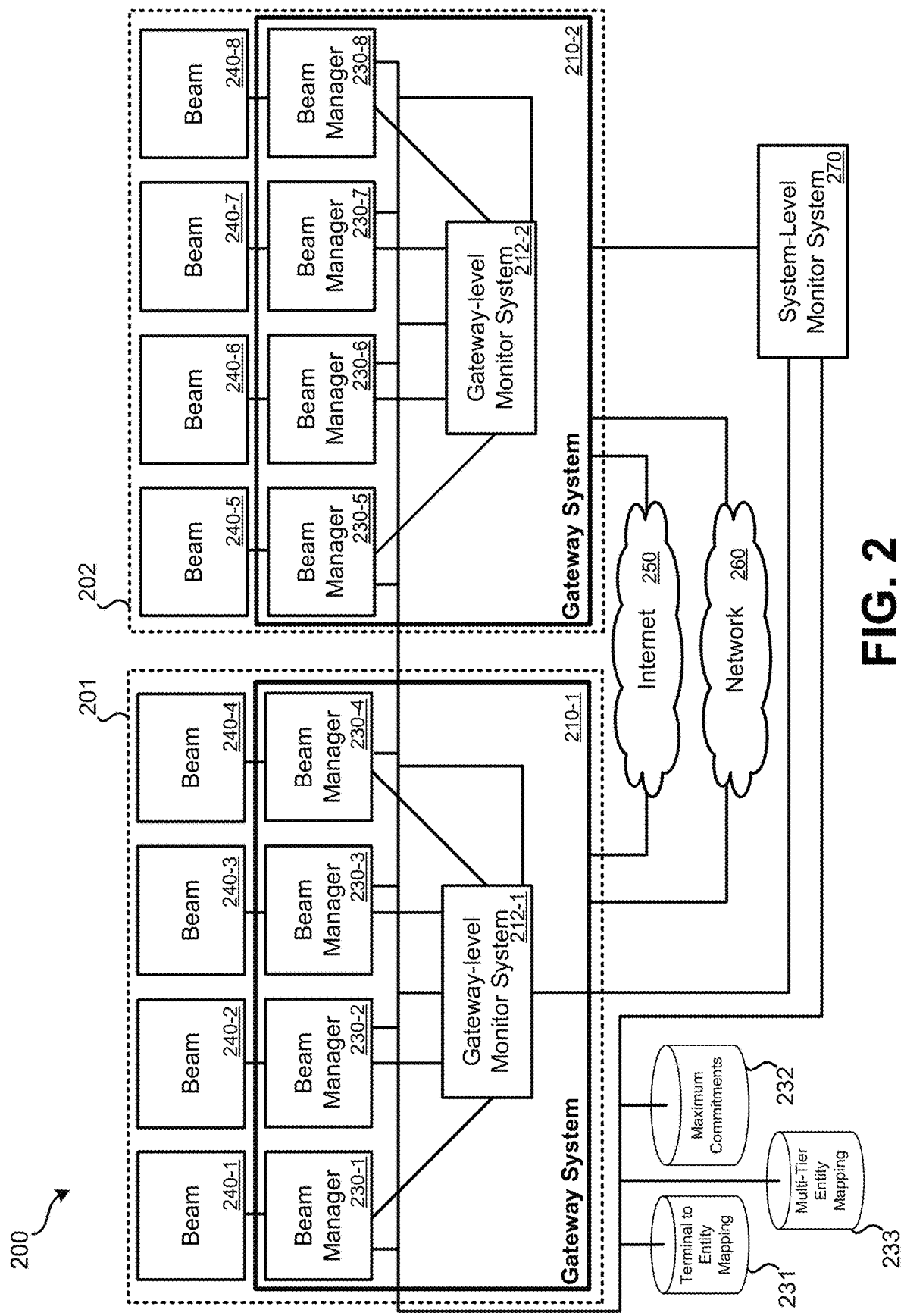
FIG. 2 illustrates a satellite network throughput management system that monitors and enforces multi-tier throughput assignments.

FIG. 2 illustrates a satellite network throughput management system 200 ("system 200") that monitors and enforces multi-tier throughput assignments. System 200 can be operated by satellite network provider 110 of FIG. 1. System 200 can include: gateway systems 210; beam managers 230; beams 240; Internet 250; network 260; and system-level monitor system 270.

Gateway systems 210 may be geographically distributed. For example, gateway system 210-1 may be located at location 201 and gateway system 210-2 may be located at location 202 to serve a different geographic region. Gateway systems 210 may serve as interfaces between a satellite communication system that performs bidirectional communication with multiple satellite terminals and one or more public and/or private networks, such as Internet 250 and network 260. Gateway systems 210 may each manage multiple beams of uplink and downlink data that are being transmitted to and received from one or more satellites. A downlink beam may be transmitted to a satellite and then relayed down to a geographic area to be received by various satellite terminals. An uplink beam may be received from a satellite that includes data received by the satellite from satellite terminals in a particular geographic area. By gateway system 210-1 managing multiple beams, such as beam 240-1 through beam 240-4, gateway system 210-1 can manage uplink and downlink data across multiple geographic regions.

While in some systems, gateway systems may represent a physical location where satellite communication occurs and a connection to one or more networks is made; in other embodiments gateway systems can be understood as a logical implementation. That is, at one physical location, satellite communication equipment may be present with a high-speed communication link to another location, which serves as the connection between the one or more networks and the satellite equipment. In such an implementation, one set of network connections may be able to service multiple sets of satellite communication equipment that is geographically distributed.

For each beam, a beam manager may be present that monitors the amount of uplink throughput and downlink throughput used by each satellite terminal. A beam manager may accomplish this by determining terminal uplink and downlink demands either indirectly by monitoring terminal packets transmitted and received and/or directly via a control plane protocol. Therefore, for a given satellite terminal that is serviced by a beam, the corresponding beam manager may maintain at least two metrics, uplink throughput and downlink throughput. Each beam manager may have access to data, such as in the form of terminal to entity mapping database 231, that relates individual satellite terminals to a particular entity. In other embodiments, data included in uplink and downlink transmissions may indicate the entity to which a satellite terminal is mapped directly.

Each beam manager may aggregate on an entity by entity basis the total current uplink throughput and downlink throughput for each entity. Therefore, for example, if 27 satellite terminals mapped to a particular entity are communicating with gateway system 210-1 via beam 240-1, beam manager 230-1 may sum the current throughput (e.g., downlink throughput or uplink throughput) for these 27 satellite terminals. The data indicative of the amount of throughput used on an entity by entity basis may be passed to a gateway level bandwidth monitor system. In the case of beam manager 230-1, the aggregated throughput data on an entity by entity basis may be passed to gateway level monitor system 212-1. As another example, in the case of a beam manager 240-7, aggregated throughput data on an entity by entity basis may be passed to gateway level bandwidth monitor system 212-2.

Each gateway system may include multiple beam managers. For example, in the example of system 200, four beam managers 230-1 through 230-4 are present. Each of these beam managers may monitor a particular uplink or downlink beam, such as beam 240-1 through beam 240-4. Each beam manager may be authorized to restrict bandwidth to satellite terminals when the group of satellite terminals collectively exceed allocated throughput. Maximum commitments database 232 may indicate the amount of uplink throughput and/or downlink throughput permitted for a given entity. Additionally present may be multitier entity mapping database 233 which indicates higher level entities that lower level entities are mapped to. For example, referring back to hierarchical structure 100, multitier entity mapping database 233 could indicate that VNO 140-1 and VNO 140-2 are mapped to network service provider 120-2 (and, therefore, the total amount of uplink throughput and/or downlink throughput is limited to the maximum commitment of network service provider 120-2).

Gateway system 210-1 further includes gateway level monitor system 212-1. Gateway level monitor system 212-1 receives throughput usage information for uplink and/or downlink communications on an entity by entity basis from all beam managers of gateway system 210-1. Therefore gateway level monitor system 212-1 receives entity by entity throughput usage data from beam manager 230-1 through beam manager 230-4. On an entity by entity basis, gateway level monitor system 212-1 aggregates the data received from the various beam managers of gateway system 210-1. Therefore, once the aggregation is complete, gateway level monitor system 212-1 has uplink and/or downlink data throughput usage information for each entity that is mapped to satellite terminals (and entities that are mapped to one or more other entities that are mapped to).

Each gateway-level monitor system may be authorized to restrict throughput of satellite terminals when the satellite terminals of the entity collectively exceed its allocated throughput. Maximum commitments database 232 may be accessed by gateway-level monitor systems 212 to determine the amount of uplink throughput and/or downlink throughput permitted for a given entity. Additionally accessed by gateway-level monitor systems 212 may be multitier entity mapping database 233 which indicates higher level entities that lower level entities are mapped to; therefore, gateway-level monitor systems 212 may also determine whether a higher-tier entity has exceeded its permitted throughput based on the throughput usage of lower-tier entities. While beam managers inspect individual beams, gateway level monitor system 212-1 aggregates and analyzes throughput usage information across multiple beam managers. Therefore, while an entity may not exceed its permitted throughput usage on a given beam, across multiple beams the entity may exceed its permitted throughput usage.

In the illustrated embodiment of system 200, two gateway systems 210 and two corresponding gateway-level monitor systems 212 are present. It should be understood that in other embodiments, a greater number of gateway systems and accompanying gateway-level monitors systems 212 may be present (with a single gateway-level monitor system for each gateway system).

Additionally present can be system-level monitor system 270. While a particular entity may not exceed its permitted throughput at a given gateway system, if the entity's satellite terminals are serviced by multiple gateway systems, the entity may exceed its permitted total throughput across multiple gateway systems 210. Such exceeding of permitted throughput would not be detected by a gateway-level monitor system. Therefore, system-level monitor system 270 can be implemented. System-level monitor system 270 can receive entity-by-entity throughput usage data from each gateway-level monitor system 212 and aggregate on an entity-by-entity basis. System-level monitor system 270 may be authorized to restrict throughput of satellite terminals when the satellite terminals of the entity collectively exceed its allocated throughput. Maximum commitments database 232 may be accessed by system-level monitor system 270 to determine the amount of uplink throughput and/or downlink throughput permitted for a given entity. Additionally accessed by gateway-level monitor systems 212 may be multitier entity mapping database 233 which indicates higher level entities that lower level entities are mapped to; therefore, system-level monitor system 270 may also determine whether a higher-tier entity has exceeded its permitted throughput based on the throughput usage of lower-tier entities.

Beam managers 230, gateway-level monitor systems 212, and system-level monitor system 270 may each include one or more special-purpose or general-purpose processors. Such special-purpose processors may include processors that are specifically designed to perform the functions of monitoring to which entity uplink and downlink traffic is mapped. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Each of beam managers 230, gateway-level monitor systems 212 and system-level monitor system 270, can restrict one or more satellite terminals mapped to an entity if it determines that the entity has exceeded its assigned throughput. System-level monitor system 270 can transmit a message to one or more gateway-level monitor systems 212 instructing which entity is to have its bandwidth restricted and by how much. System-level monitor system 270 may access rules stored as part of, for example, maximum commitments database 232, that indicates the structure of how throughput should be decreased (i.e., restricted) for the entity's satellite terminals. In some embodiments, a rule may state that each satellite terminal of the entity has its throughput decreased equally; in other embodiments, a rule may state that satellite terminals communicating with a particular gateway system of gateway systems 210 are first decreased and, if necessary, satellite terminals communicating with a second gateway system 210 are then decreased. In other embodiments, different classes of satellite terminals may be established for an entity, with a first class of satellite terminals being restricted before a second class of satellite terminals are restricted.

In an embodiment such as network service provider 120-2, which is responsible for providing service to multiple VNOs on the third tier, a rule may be present that indicates that satellite terminals mapped to a particular VNO is to be restricted to a threshold throughput before restricting another VNO. Similar arrangements may be present for additional entities as a greater number of tiers are present.

A gateway-level monitor system of gateway-level monitor systems 212 upon receiving a message from system-level monitor system 270 or upon making a determination itself that throughput for an entity needs to be restricted, may transmit a message to one or more beam managers with which the gateway-level monitor system communicates. The message can indicate the entity and the amount by which throughput should be decreased. Again here, just as various rules defined whether throughput was restricted across all gateway systems equally or if particular gateways were restricted first by system-level monitor system 270, a similar analysis may be performed by the gateway-level monitor system to determine whether satellite terminals mapped to the entity should be restricted equally across all beams or satellite terminals that communicate via particular beams should be restricted first (e.g., up to a threshold amount) before satellite terminals that communicate with the gateway system via other beams.

For a beam manager of beam managers 230, when a message is received from a corresponding gateway-level monitor system or upon making a determination itself that throughput for an entity needs to be restricted, the beam manager may perform a lookup, such as using terminal to entity mapping database 231, to determine the specific satellite terminals that are to be restricted. Again here, just as various rules defined whether throughput was restricted across all beams equally or if satellite terminals on particular beams were restricted first, a similar analysis may be performed by the beam manager to determine whether satellite terminals mapped to the entity should be restricted equally or if particular satellite terminals should be restricted first (e.g., up to a threshold) in order to decrease overall throughput to the amount necessary to satisfy the received message or as determined by the beam manager.

While gateway-level monitor systems 212 and system-level monitor system 270 analyze on an entity-by-entity basis, only beam managers 230 may be analyzing on a satellite terminal by satellite terminal basis. Therefore, at the gateway-level and system-level, specifics of particular satellite terminals are not necessary.

Additionally or alternatively, analysis may be performed on a satellite-by-satellite basis. Therefore, for all data transmitted via a satellite, an aggregation may be performed on an entity-by-entity basis to determine if each entity has exceeded its allocated bandwidth.

Figure 3:
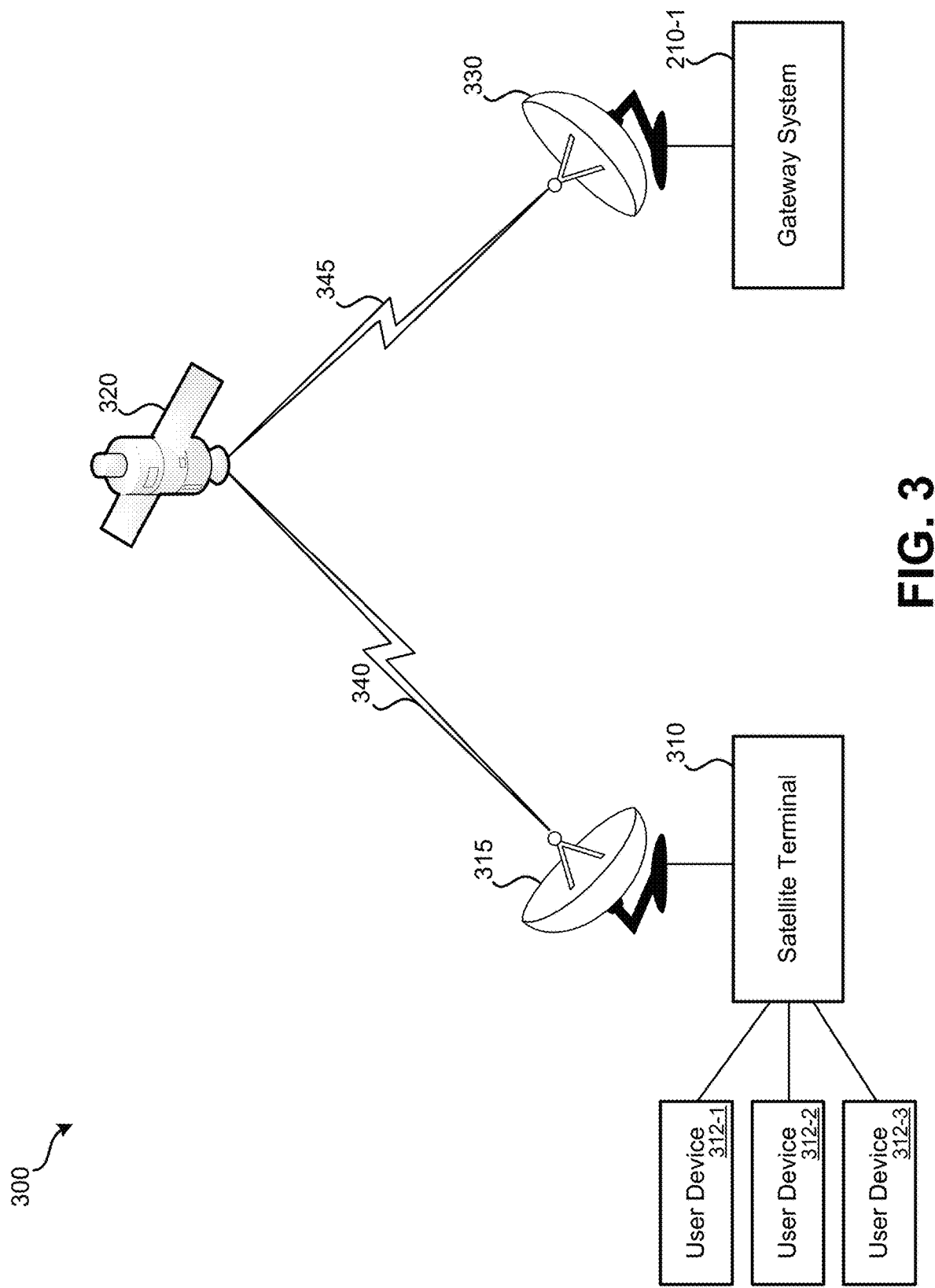
FIG. 3 illustrates an embodiment of a system for communication between a terminal and a gateway via satellite

FIG. 3 illustrates an embodiment of a system 300 for communication between a terminal and a gateway via satellite. System 300 can include: satellite terminal 310; satellite antenna 315; satellite 320; gateway system 210-1; satellite gateway antenna 330; and network 335. System 300 can function in concert with system 200 of FIG. 2 to perform bidirectional satellite-based communication between user devices and one or more networks.

Satellite terminal 310 may be any form of device that communicates with gateway system 210-1 via a bidirectional satellite communication link, such as a satellite modem that communicates with various user devices 312. In some embodiments, satellite terminal 310 is an access point (AP) that allows one or more computerized devices, such as user devices 312 (e.g., 312-1, 312-2, and 312-3) to communicate with gateway system 210-1 via satellite terminal 310.

For instance, satellite terminal 310 may be an access point on a train, ship, airplane, or a mobile or fixed wired or wireless network. Satellite terminal 310 may be a very small aperture terminal (VSAT) that uses a relatively small satellite dish antenna pointed in a fixed direction toward a geostationary satellite that relays data between satellite terminal 310 and satellite gateway antenna 330 of gateway system 210-1.

Satellite antenna 315 may be capable of transmitting signals to satellite 320 and receiving signals from satellite 320. Wireless signal 340 can represent an uplink signal that is transmitted by satellite antenna 315 along the return path to satellite 320. Wireless signal 340 can also represent a downlink signal from satellite 320 to satellite antenna 315. Satellite antenna 315 is in communication with satellite terminal 310 such that satellite terminal 310 can transmit signals to satellite antenna 315 for transmission and receive signals from satellite antenna 315.

Satellite 320 may be low earth orbit (LEO), middle earth orbit (MEO), or geosynchronous earth orbit (GEO). If in LEO or MEO, satellite 320 may move in and out of communication range with satellite antenna 315 (and satellite gateway antenna 330), one or more additional satellites may have different orbits that allow such additional satellites to serve as the relay in the communication link between satellite antenna 315 and satellite gateway antenna 330 when satellite 320 is out of range. For instance, with LEO and MEO satellites, a satellite constellation could be used and where throughput used on satellite could be throughput through entire path through the satellite constellation including inter-satellite links (ISLs).

Satellite 320 can communicate with gateway system 210-1 via satellite gateway antenna 330. Wireless signal 345 can represent a signal transmitted from satellite gateway antenna 330 to satellite 320 or a signal transmitted from satellite 320 to satellite gateway antenna 330. Satellite 320 may serve to relay transmissions between satellite terminal 310 and gateway system 210-1 with little or no processing performed on such signals by satellite 320. Satellite 320 may alter the frequency at which the signals are relayed between satellite terminal 310 and gateway system 210-1.

In the example of FIG. 3, a single satellite terminal 310 is illustrated as communicating with gateway system 210-1. It should be understood that in a real-world embodiments, a large number of satellite terminals may communication via satellite 320 (or more than one satellite) with gateway system 210-1. Further multiple gateway systems may be present that communicate with various other satellite terminals.

Figure 4:
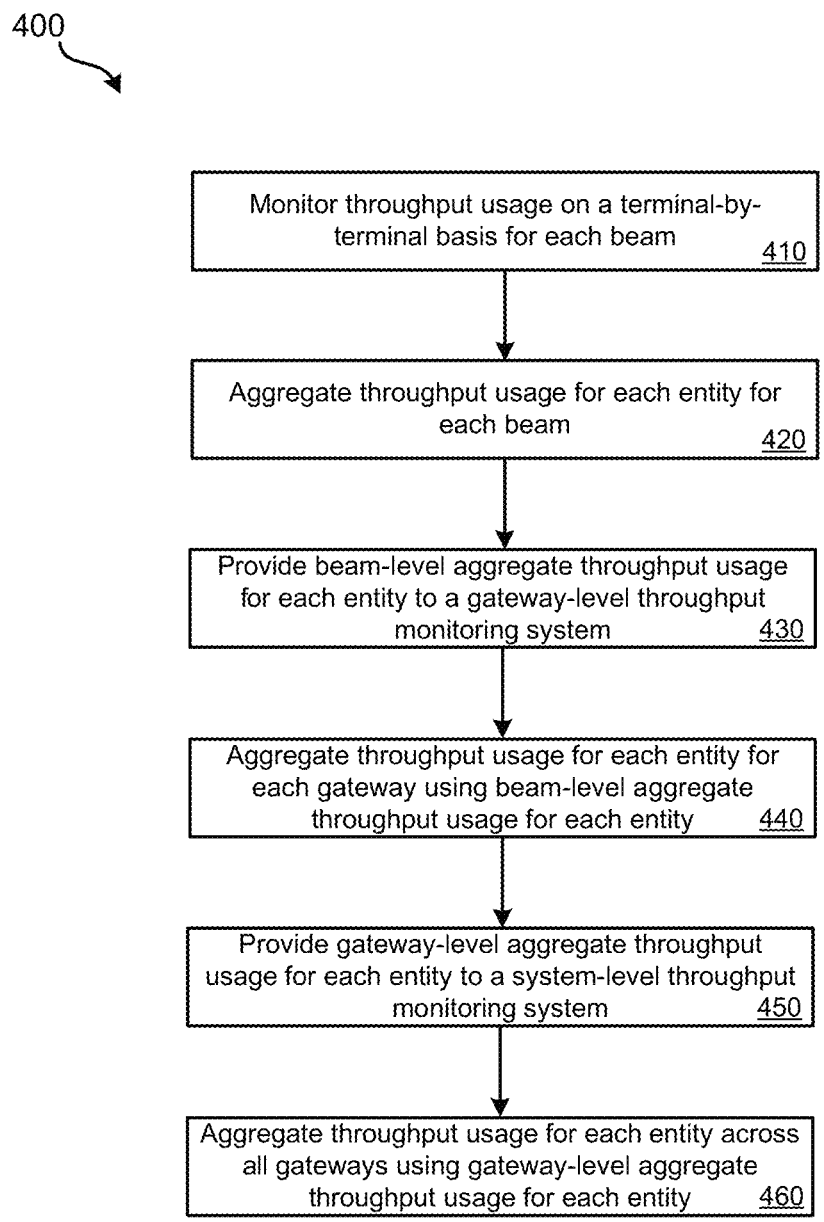
FIG. 4 illustrates an embodiment of a method for monitoring multi-tier throughput assignments.

Various methods can be performed using the systems and structures detailed in FIGS. 1-3. FIG. 4 illustrates an embodiment of a method 400 for monitoring multi-tier throughput on an entity-by-entity basis. The various blocks of method 400 can be performed using components of system 200. Further detail is provided in relation to each block as detailed below.

At block 410, throughput usage may be monitored on a terminal-by-terminal basis for each uplink beam and downlink beam at each gateway system. For each beam, a beam monitor may be present that monitors the amount of uplink throughput and downlink throughput used by each satellite terminal. At block 420, based on data stored by the beam monitor or otherwise accessible by the beam monitor (e.g., terminal to entity mapping database 231), the beam monitor may aggregate the total amount of uplink throughput and the total amount of downlink throughput used by each entity which has one or more satellite terminals that is serviced by the beam. This aggregation can include calculating a total amount of uplink throughput and total amount of downlink throughput for a higher tier entity that provides network access for one or more lower tier entities, such as network service provider 120-2 providing network access for VNOs 140. At block 430, beam level aggregate uplink and downlink throughput usage for each entity may be provided to a gateway level throughput monitoring system.

At block 440, based on data received from multiple beam monitors, a gateway-level throughput monitoring system may aggregate the total amount of uplink throughput and the total amount of downlink throughput used by each entity which has one or more satellite terminals that is serviced by the gateway across all of the gateway's beams. This aggregation can include calculating a total amount of uplink throughput and total amount of downlink throughput for a higher tier entity that provides network access for one or more lower tier entities, such as network service provider 120-2 providing network access for VNOs 140. At block 450, gateway-level aggregate uplink and downlink throughput usage for each entity may be provided to a system-level throughput monitoring system.

At block 460, based on the data received from multiple gateway-level throughput monitoring systems, a system-level throughput monitoring system may aggregate the total amount of uplink throughput and the total amount of downlink throughput used by each entity which has one or more satellite terminals serviced across the entirety of the satellite network provider. This aggregation can include calculating a total amount of uplink throughput and total amount of downlink throughput for a higher tier entity that provides network access for one or more lower tier entities, such as network service provider 120-2 providing network access for VNOs 140.

Figure 5:
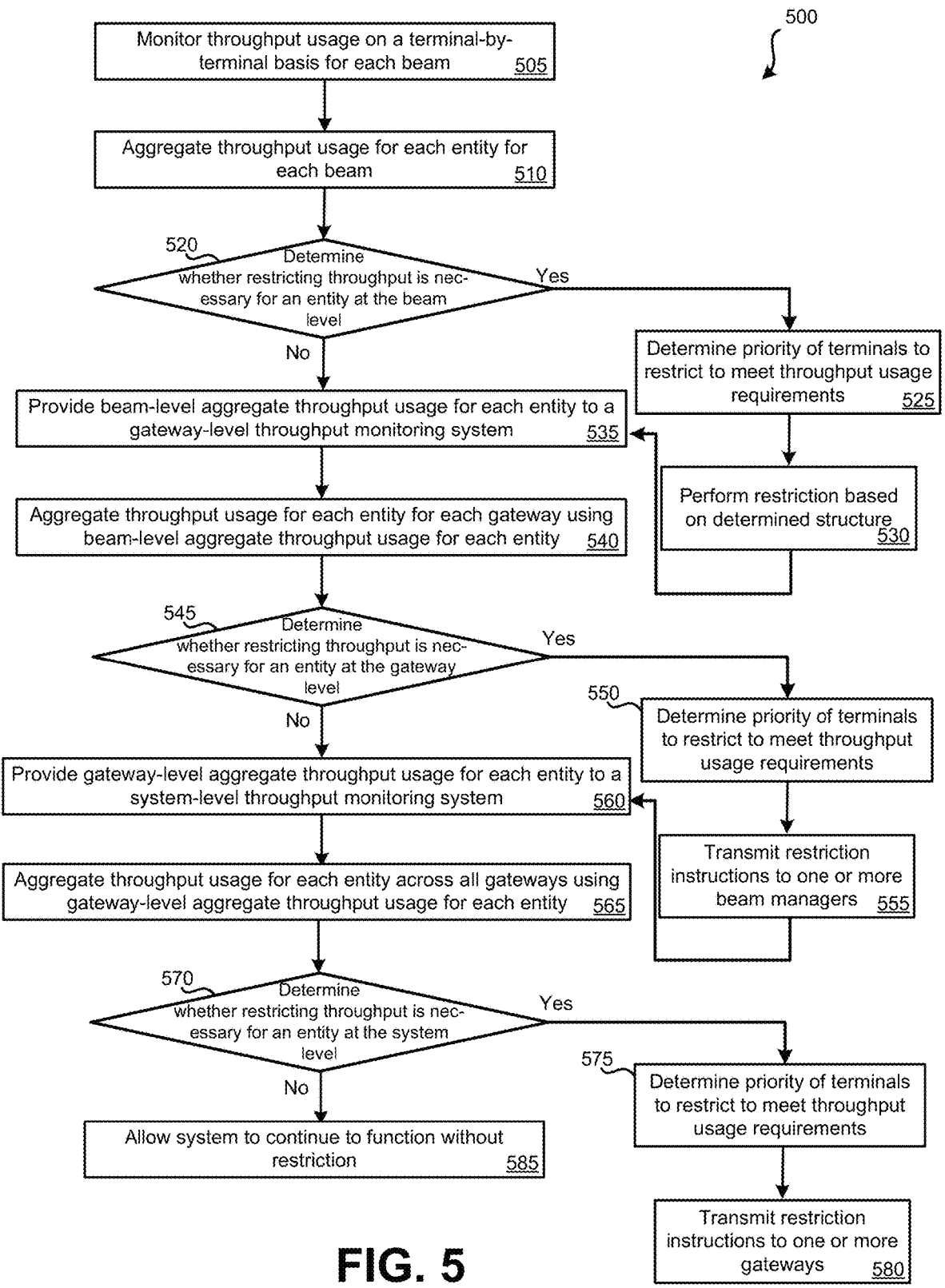
FIG. 5 illustrates an embodiment of a method for enforcing multi-tier throughput assignments.

FIG. 5 illustrates an embodiment of a method 500 for enforcing multi-tier throughput assignments. Method 500 can represent a more detailed embodiment of method 400 of FIG. 4. The various blocks of method 500 can be performed using components of system 200. Further detail is provided in relation to each block as detailed below.

At block 505, throughput usage may be monitored on a terminal-by-terminal basis for each uplink beam and downlink beam at each gateway system. For each beam, a beam monitor may be present that monitors the amount of uplink throughput and downlink throughput used by each satellite terminal. At block 510, based on data stored by the beam monitor or otherwise accessible by the beam monitor (e.g., terminal to entity mapping database 231), the beam monitor may aggregate the total amount of uplink throughput and the total amount of downlink throughput used by each entity which has one or more satellite terminals that is serviced by the beam. This aggregation can include calculating a total amount of uplink throughput and total amount of downlink throughput for a higher tier entity that provides network access for one or more lower tier entities, such as network service provider 120-2 providing network access for VNOs 140.

At block 520, the beam monitor may perform a determination as to whether restricting (or decreasing) the uplink and/or downlink throughput for a particular entity is necessary at the beam level. The beam monitor may have access to information (e.g., maximum commitments database 232) that defines how much uplink throughput and/or downlink throughput a particular entity has been allotted. This determination at block 520 can include performing the determination for higher-tier entities that have allocated uplink and/or downlink throughput for lower tier entities (such as network service provider 120-2 providing uplink and downlink throughput for VNOs 140).

If the determination is made at block 520 that restricting is necessary for a particular entity, method 500 may proceed to block 525. At block 525, a determination may be made of the priority of satellite terminals to restrict in order to meet throughput usage requirements for the particular entity. Restricting may be performed at block 530 based on the determined priority of block 525. The restricting performed by the beam manager may be performed at the beam level, that is, restricting performed by this beam manager may not affect actions taken by other beam managers. From block 530, method 500 may proceed to block 535. If, at block 520, the determination is made in the negative, method 500 may proceed directly to block 535. At block 535, beam level aggregate uplink and downlink throughput usage for each entity (which can include adjustments made for the restricting, if any is performed) may be provided to a gateway level throughput monitoring system.

At block 540, based on data received from multiple beam monitors of the gateway system, each gateway-level monitor system may aggregate the total amount of uplink throughput and the total amount of downlink throughput used by each entity which has one or more satellite terminals that is serviced by the beams of the gateway system. This aggregation can include calculating a total amount of uplink throughput and total amount of downlink throughput for a higher tier entity that provides network access for one or more lower tier entities, such as network service provider 120-2 providing network access for VNOs 140.

At block 545, the gateway-level monitor system may perform a determination as to whether restricting (or decreasing) the uplink and/or downlink throughput for a particular entity is necessary at the gateway level. The gateway-level monitor system may have access to information (e.g., maximum commitments database 232) that defines how much uplink throughput and/or downlink throughput a particular entity has been allotted. This determination at block 545 can include performing the determination for higher-tier entities that have allocated uplink and/or downlink throughput for lower tier entities (such as network service provider 120-2 providing uplink and downlink throughput for VNOs 140).

If the determination is made at block 545 by the gateway-level monitor system that restricting is necessary for a particular entity, method 500 may proceed to block 550. At block 550, a determination may be made of the priority of beams on which restricting may be performed in order to meet throughput usage requirements for the particular entity (in some embodiments, restricting may be applied equally across all satellite terminals of an entity regardless of beam). Restricting may be triggered at block 555 based on the determined priority of block 525 by transmitting a message indicating the entity and the amount of restricting necessary to one or more beam managers that control the beams that service satellite terminals of the entity. The restricting triggered by the gateway-level monitor system may be performed at the gateway level, that is, restricting performed by a particular gateway-level monitor system may not affect actions taken by other gateway-level monitor systems. From block 555, method 500 may proceed to block 560. If, at block 545, the determination is made in the negative, method 500 may proceed directly to block 560. At block 560, gateway-level aggregate uplink and downlink throughput usage for each entity (which can include adjustments made for the restricting, if any is triggered at the gateway-level) may be provided to a system-level throughput monitoring system.

At block 565, based on data received from multiple gateway-level monitor systems of the satellite network provider's system, the system-level monitor system may aggregate the total amount of uplink throughput and the total amount of downlink throughput used by each entity across the entirety of the satellite network provider's system. This aggregation can include calculating a total amount of uplink throughput and total amount of downlink throughput for a higher tier entity that provides network access for one or more lower tier entities, such as network service provider 120-2 providing network access for VNOs 140.

At block 570, the system-level monitor system may perform a determination as to whether restricting (or decreasing) the uplink and/or downlink throughput for a particular entity is necessary at the system level. The system-level monitor system may have access to information (e.g., maximum commitments database 232) that defines how much uplink throughput and/or downlink throughput a particular entity has been allotted. This determination at block 545 can include performing the determination for higher-tier entities that have allocated uplink and/or downlink throughput for lower tier entities (such as network service provider 120-2 providing uplink and downlink throughput for VNOs 140).

If the determination is made at block 570 by the system-level monitor system that restricting is necessary for a particular entity, method 500 may proceed to block 575. At block 575, a determination may be made of the priority of gateways on which restricting may be performed for the particular entity in order to meet throughput usage requirements for the entity (in some embodiments, restricting may be applied equally across all satellite terminals of an entity regardless of gateway and/or beam). Restricting may be triggered at block 580 based on the determined priority of block 575 by transmitting a message indicating the entity and the amount of restricting necessary to one or more gateway-level monitor systems that, in turn, triggers one or more beam controllers that control the beams that service satellite terminals of the entity. The restricting triggered by the system-level monitor system may be performed at the system level, that is, restricting performed by system-level monitor system represents the highest level of monitoring on the system basis and can ultimately control all gateway-level monitor systems and beam controllers. If, at block 570, the determination is made in the negative, method 500 may proceed directly to block 585. At block 585, if the system may be permitted to continue functioning without any high-level restricting of uplink and/or downlink throughput for an entity being triggered.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A satellite network throughput management system comprising:
   a satellite gateway that serves to connect a plurality of satellite terminals with one or more networks;
   a plurality of beam managers, wherein:
      each beam manager of the plurality of beam managers monitors a different satellite beam at the satellite gateway;
      each beam manager of the plurality of beam managers determine a throughput amount used by each entity of a plurality of entities;
      each entity of the plurality of entities is mapped to the plurality of satellite terminals; and
   a gateway-level throughput monitoring system that is in communication with each of the plurality of beam managers and aggregates the throughput amount used by each of the plurality of entities.

2. The satellite network throughput management system of claim 1, further comprising a throughput allocation database that defines an allocated throughput amount for each entity of the plurality of entities.

3. The satellite network throughput management system of claim 2, wherein the gateway-level throughput monitoring system is configured to restrict an amount of throughput allocated to a particular entity of the plurality of entities in response to satellite terminals mapped to the particular entity collectively requesting more throughput from the satellite gateway associated with the gateway-level throughput monitoring system than allocated to the particular entity in the throughput allocation database.

4. The satellite network throughput management system of claim 3, wherein:
   the particular entity is a service provider entity; and
   the gateway-level throughput monitoring system is configured to restrict the amount of throughput allocated to each satellite terminal of the subset of the entities mapped to the service provider entity.

5. The satellite network throughput management system of claim 2, further comprising a system-level throughput monitoring system that is in communication with each of a plurality of gateway-level throughput monitoring systems and aggregates the throughput amount used by each of the plurality of entities, wherein the plurality of gateway-level throughput monitoring systems comprises the gateway-level monitoring system.

6. The satellite network throughput management system of claim 5, wherein the system-level throughput monitoring system determines that an entity of the plurality of entities is to have an amount of throughput allocated to the entity restricted in response to the entity requesting more throughput across multiple satellite gateways of a plurality of satellite gateways than allocated to the entity in the throughput allocation database.

7. The satellite network throughput management system of claim 6, wherein the system-level throughput monitoring system is configured to transmit a request to a satellite gateway of the plurality of satellite gateways to restrict throughput for satellite terminals mapped to the entity.

8. The satellite network throughput management system of claim 1, wherein:
  a subset of entities of the plurality of entities obtain network access through a service provider entity of the plurality of entities; and
  each entity of the subset of entities is restricted by an individual amount of throughput allocated to the entity and a total throughput allocated to the service provider entity.

9. The satellite network throughput management system of claim 1, wherein the gateway-level throughput monitoring system is configured to transmit a request to a beam manager of a plurality of beam managers to restrict throughput for satellite terminals mapped to the entity.

10. The satellite network throughput management system of claim 1, further comprising one or more satellites that relay data between the plurality of satellite terminals and a plurality of satellite gateways.

11. The satellite network throughput management system of claim 1, wherein the satellite gateway is configured to allocate available throughput as a function of demand relative to committed information rates (CIRs) and excess available throughput is allocated to a particular entity of the plurality of entities as a further function of demand.

12. A method for monitoring and enforcing throughput assignments comprising:
  providing beam-level aggregate throughput usage for each entity of a plurality of entities to a gateway-level throughput monitoring system on a plurality of satellite communication beams, wherein:
    each entity of the plurality of entities is associated with multiple satellite terminals that use one or more satellites for network communication;
  aggregating, by the gateway-level throughput monitoring system of a satellite gateway, throughput usage for each entity of the plurality of entities based on beam-level aggregate throughput usage on an entity-by-entity basis for the satellite gateway;
  providing gateway-level aggregate throughput usage for each entity of the plurality of entities by a plurality of satellite gateways to a system-level throughput monitoring system; and
  aggregating, by a system-level throughput monitoring system, throughput usage for each entity of the plurality of entities based on gateway-level aggregate throughput usage on the entity-by-entity basis for a system-level.

13. The method of claim 12, further comprising:
determining that restricting throughput is to be performed for an entity on a beam of the plurality of satellite communication beams based on accessing a throughput allocation database that defines an allocated throughput amount for each entity of the plurality of entities.

14. The method of claim 12, further comprising:
determining, for the satellite gateway, that restricting throughput for an entity is to be performed for multiple beams of the plurality of satellite communication beams based on accessing a throughput allocation database that defines an allocated throughput amount for each entity of the plurality of entities.

15. The method of claim 12, wherein:
a subset of entities of the plurality of entities obtain network access through a service provider entity of the plurality of entities; and
each entity of the subset of entities is restricted by an individual amount of throughput allocated to the entity and a total throughput allocated to the service provider entity.

16. The method of claim 15, further comprising:
restricting an amount of throughput allocated to the service provider entity restricted in response to the entity collectively requesting more throughput across multiple satellite gateways of the plurality of satellite gateways than allocated to the service provider entity in a throughput allocation database.

17. The method of claim 16, further comprising:
transmitting, by the system-level throughput monitoring system, a request to the satellite gateway of the plurality of satellite gateways to restrict throughput for satellite terminals mapped to the subset of entities that are mapped to the service provider entity.

18. The method of claim 12, further comprising:
restricting an amount of throughput allocated to a particular entity of the plurality of entities in response to satellite terminals mapped to the particular entity collectively requesting more throughput through the satellite gateway than allocated to the particular entity in a throughput allocation database.

19. The method of claim 12, further comprising:
determining, at a system-level, that restricting throughput is to be performed at multiple satellite gateways based on accessing a throughput allocation database that defines an allocated throughput amount for each entity of the plurality of entities.

20. The method of claim 12, wherein each satellite gateway of a plurality of satellite gateways allocates excess available throughput, up to an amount demanded, to a particular entity of the plurality of entities.

* * * * *